US010625812B2

United States Patent
Omosako (10) Patent No.: US 10,625,812 B2
(45) Date of Patent: Apr. 21, 2020

(54) SWING ARM

(71) Applicant: SUZUKI MOTOR CORPORATION, Shizuoka-Ken (JP)

(72) Inventor: Takahiro Omosako, Hamamatsu (JP)

(73) Assignee: SUZUKI MOTOR CORPORATION (JP)

(*) Notice: Subject to any disclaimer, the term of this patent is extended or adjusted under 35 U.S.C. 154(b) by 219 days.

(21) Appl. No.: 15/855,267

(22) Filed: Dec. 27, 2017

(65) Prior Publication Data
US 2018/0215440 A1   Aug. 2, 2018

(30) Foreign Application Priority Data

Jan. 30, 2017   (JP) ................. 2017-014669

(51) Int. Cl.
| B62K 25/20 | (2006.01) |
| B62K 25/28 | (2006.01) |
| B62K 11/04 | (2006.01) |
| B62K 11/02 | (2006.01) |

(52) U.S. Cl.
CPC .............. *B62K 25/20* (2013.01); *B62K 11/02* (2013.01); *B62K 11/04* (2013.01); *B62K 25/283* (2013.01)

(58) Field of Classification Search
CPC ...... B62K 25/10; B62K 25/28; B62K 25/283; B62K 11/02; B62K 25/20
USPC .......................................... 180/227; 280/284
See application file for complete search history.

(56) References Cited

U.S. PATENT DOCUMENTS

| 7,815,005 | B2 * | 10/2010 | Masuda | B62K 25/283 |
| | | | | 180/219 |
| 2003/0015365 | A1 * | 1/2003 | Miyashiro | B62K 25/283 |
| | | | | 180/227 |
| 2017/0088227 | A1 * | 3/2017 | Yamamoto | B62K 25/283 |
| 2019/0291781 | A1 * | 9/2019 | Bierbaumer | B62D 29/004 |

FOREIGN PATENT DOCUMENTS

| JP | H01-223092 A | | 9/1989 | |
| JP | 1293291 | * | 11/1989 | ............. B62K 25/10 |
| JP | 2175482 | * | 7/1990 | ............. B62K 25/20 |
| JP | 5178260 | * | 7/1993 | ............. B62K 25/20 |

* cited by examiner

*Primary Examiner* — Anne Marie M Boehler
(74) *Attorney, Agent, or Firm* — Barnes & Thornburg LLP (57) ABSTRACT

A swing arm secures rigidity, and is lighter than a conventional swing arm, includes a hollow body with a pivot hole in which a pivot shaft is disposed, a suspension fixing portion in the body connected to one end portion of a suspension unit, and a pair of arms extending from the body and supporting respective ends of a wheel axle. Each of the pair of arms includes an outer member having an open cross-section and an inner member having an open cross-section. The outer member and the inner member of each of the arms are joined at respective open end portions. The body includes first opening portions joined with a corresponding one edge portion of the outer member of the arms, second opening portions joined with a corresponding outer surface of the inner member of the arms, and reinforcing support-struts that partition the first and second opening portions.

2 Claims, 7 Drawing Sheets

SWING ARM

CROSS-REFERENCE TO RELATED APPLICATIONS

This application claims the benefit of priority of Japanese Patent Application No. 2017-014669, filed on Jan. 30, 2017, the entire contents of which are incorporated herein by reference.

BACKGROUND OF THE INVENTION

Field of the Invention

The present invention relates to a swing arm.

Description of the Related Art

In a vehicle such as a motorcycle, there is known a swing arm includes a pair of right and left arm portions for rotatably supporting a rear wheel and a body portion provided between the front ends of the respective arm portions to connect the pair of arm portions with each other. At the front end portion of the body portion, there is provided a pivot portion that swingably supports the swing arm on a vehicle body frame (see, e.g., Japanese Unexamined Patent Application Publication No. H01-223092).

SUMMARY OF THE INVENTION

Each of the arm portions of the conventional swing arm includes an outer member having an open cross-section and an inner member that is combined with the outer member and has an open cross-section. The front end portion of the outer member of the right arm portion and the front end portion of the outer member of the left arm portion respectively cover the right and left opening portions of the body portion. The front end portions of the respective inner members of the right and left arm portions are in contact with the rear wall of the body portion. The front end portion of each of the outer members and the front end portion of each of the inner members are fixed with welding to the body portion.

The body portion is an extrusion molding article. A reinforcing wall extending in the width direction is provided in the internal space of the body portion.

However, the reinforcing wall crossing the internal space of the body portion increases the weight of the swing arm.

To solve the problems described above, it is an object of the present invention to provide a swing arm that can secure rigidity thereof and is lighter than the conventional swing arm equipped with a reinforcing wall crossing the internal space of the body.

To achieve the above object, an aspect of the present invention provides a swing arm including: a hollow body provided with a pivot hole in which a pivot shaft is disposed; a suspension fixing portion provided in the body and connected to one end portion of a suspension unit; and a pair of arms extending from the body and supporting respective ends of an axle of a wheel. Each of the pair of arms comprises an outer member having an open cross-section and an inner member having an open cross-section. The outer member and the inner member of each of the arms are joined at respective open end portions. The body includes first opening portions joined with a corresponding one edge portion of the outer member of the arms, second opening portions joined with a corresponding outer surface of the inner member of the arms, and reinforcing support-struts that partition the first opening portions and the second opening portions and are joined with the corresponding one edge portion of the inner member of the arms.

In preferred embodiments of the above aspect, the following modes may be provided.

It may be desired that the first opening portions comprise a pair of right and left first opening portions. The second opening portions comprise a pair of right and left second opening portions. The suspension fixing portion is arranged in the area between a region including the right first opening portion and the right second opening portion and an opposite region including left first opening portion and the left second opening portion, in the body.

DETAILED DESCRIPTION

Hereinafter, an embodiment of a swing arm according to the present invention will be described with reference to FIG. 1 to FIG. 7.

Figure 1:
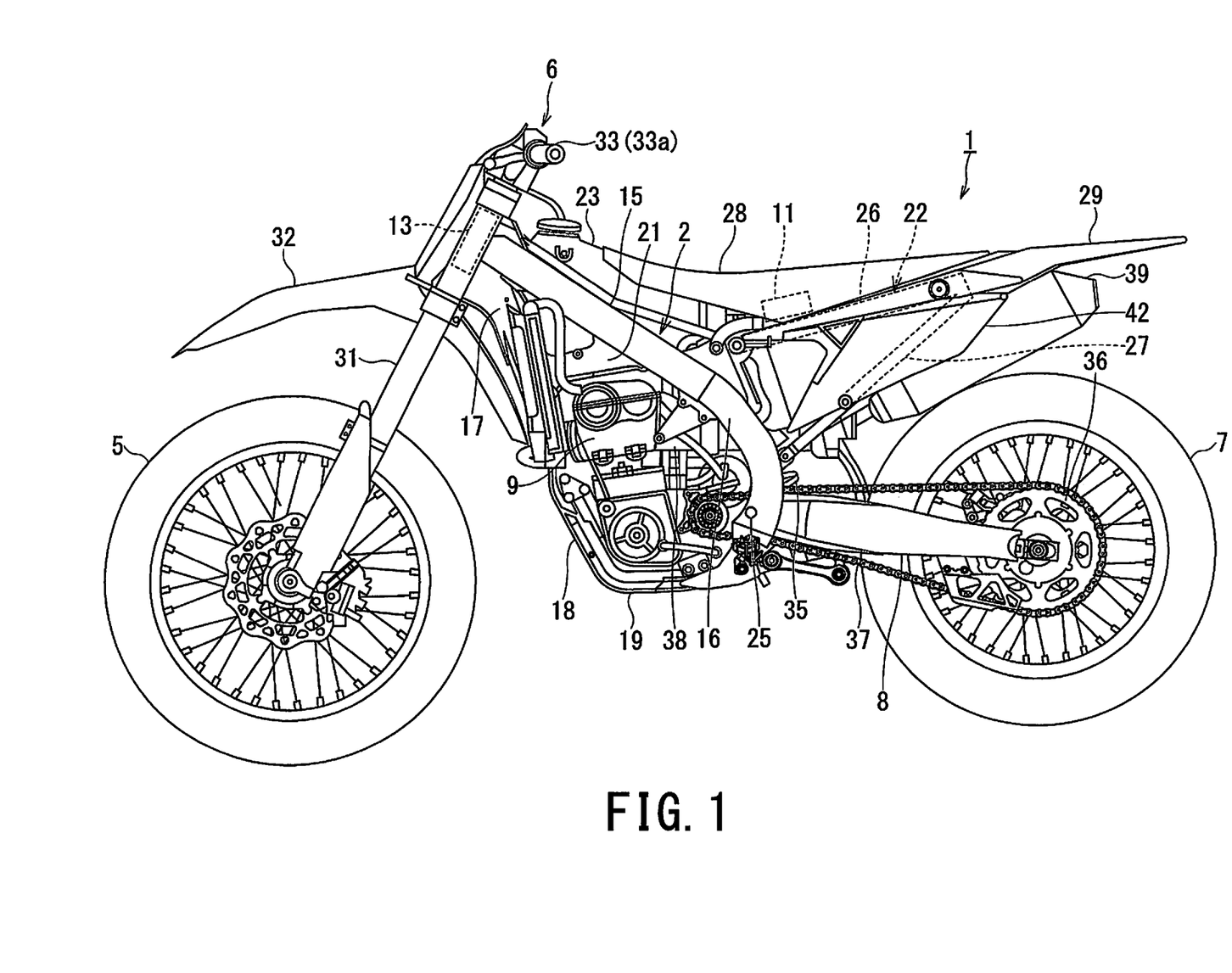
FIG. 1 is a left side view of a motorcycle to which the swing arm according to an embodiment of the present invention is applied.

FIG. 1 is a left side view of a motorcycle to which the swing arm according to the embodiment of the present invention is applied.

In the present embodiment, directional terms of the motorcycle 1 such as front, rear, upper, lower, right, and left are used with reference to a rider who is riding on the motorcycle 1.

As shown in FIG. 1, the motorcycle 1 according to the embodiment of the present invention is, e.g., an off-road motorcycle such as a dual-purpose motorcycle or motocrosser suitable for running uneven ground, irregular ground and rough terrain. The motorcycle 1 includes a body frame 2, a front wheel 5, a steering mechanism 6, a rear wheel 7, a swing arm 8, an engine 9, and an engine control module 11. The body frame 2 extends in the longitudinal direction of the motorcycle 1. The front wheel 5 is disposed in front of the body frame 2. The steering mechanism 6 is provided in front of the body frame 2 so as to rotatably support the front wheel 5. The rear wheel 7 is disposed behind the body frame 2. The swing arm 8 extends rearward of the body frame 2 so as to rotatably support the rear wheel 7. The engine 9 is mounted on the lower center portion of the body frame 2. The engine control module 11 controls each operation of the engine 9.

The body frame 2 is a so-called cradle type. The body frame 2 includes a head pipe 13, a pair of right and left main frames 15, a pair of right and left pivot frames 16, a down tube 17, a joint member 18, a pair of right and left lower tubes 19, a pair of right and left bridges 21, and a rear frame 22. The head pipe 13 is disposed at the front upper end portion. The pair of right and left main frames 15 are connected to the head pipe 13. The pair of right and left pivot frames 16 are connected to the respective rear end portions of the right and left main frames 15. The down tube 17 is connected to the head pipe 13, and the joint member 18 is connected to the down tube 17. The pair of right and left lower tubes 19 are connected to respective branched end portions of the joint member 18. The right bridge 21 is bridged between the right main frame 15 and the down tube 17, and the left bridge 21 is bridged between the left main frame 15 and the down tube 17. The rear frame 22 is connected to the pair of right and left pivot frames 16.

Each of the main frames 15 extends obliquely rearward and downward from the front end portion connected to the head pipe 13. Each of the pivot frames 16 hangs downward from the front end portion connected to the rear end portion of each of the right and left main frames 15. The down tube 17 extends downward from the end portion connected to the head pipe 13. The joint member 18 bifurcates, i.e., branches to the right and left of the motorcycle 1. The respective lower tubes 19 are connected to the branch end portions of the joint member 18. Each of the lower tubes 19 extends downward from the connection end with the joint member 18. The respective lower tubes 19 are bent rearward in the middle thereof so as to protect the lower part of the engine 9, and are connected to the lower end portions of the respective pivot frames 16. The rear frame 22 extends rearward from the connection end with the pivot frames 16.

The head pipe 13 is the rotation center of the steering mechanism 6. The head pipe 13 supports the steering mechanism 6 on the body frame 2.

The right and left main frames 15 also serve as tank rails. The right and left main frames 15 support a fuel tank 23 disposed above the main frames 15. The right and left main frames 15 suspend the engine 9 disposed below the fuel tank 23.

The right and left pivot frames 16 support a pivot shaft 25 that is the rotation center of the swing arm 8.

The rear frame 22 includes a pair of right and left seat rails 26 and a pair of right and left seat pillar tubes 27. The pair of right and left seat rails 26 extends obliquely rearward and upward from the respective rear end portions of the right and left main frames 15 and the respective top portions of the right and left pivot frames 16. The pair of right and left seat pillar tubes 27 extends obliquely upward and rearward from the rear sides of the respective central portions of the pivot frames 16, and is connected to the respective rear portions of the seat rails 26. The seat rails 26 support a seat 28 and a rear fender 29 that extends rearward of the seat 28 and covers the upper part of the rear wheel 7.

The steering mechanism 6 includes a pair of right and left front forks 31, a front fender 32, and a handle 33 that is connected to the top of the front fork 31. The pair of right and left front forks 31 rotatably support the front wheel 5. The front fender 32 covers the region above the front wheel 5. A non-illustrated suspension mechanism is installed in each of the front forks 31. A rider can steer the front wheel 5 to the right or left by gripping the handles 33. The handle 33 on the right side of the motorcycle 1 is an accelerator grip 33a.

The swing arm 8 is swingably supported with the body frame 2, and rotatably supports the rear wheel 7. A rear suspension unit 35 is installed between the swing arm 8 and the body frame 2. The rear suspension unit 35 buffers the force transmitted from the rear wheel 7 to the body frame 2.

The rear wheel 7 includes a driven sprocket 36. A drive chain 37 passes over the driven sprocket 36, and transmits the driving force from the engine 9 to the rear wheel 7.

The engine 9 is, e.g., an internal combustion engine of four cycles. The engine 9 includes a non-illustrated piston configured to reciprocate in the vertical direction of the motorcycle 1 and a non-illustrated cylinder that houses the piston. The engine 9 is disposed between the down tube 17 and the main frames 15. The engine 9 includes a fuel injection device 38 that supplies air-fuel mixture. The engine 9 is connected to an exhaust muffler 39. The exhaust muffler 39 extends toward the rear of the motorcycle 1, and discharges exhaust gas of the engine 9 to the rear of the motorcycle 1.

The motorcycle 1 further includes a frame cover 42 that covers the right and left of the space below the seat 28.

Next, the swing arm 8 of the motorcycle 1 according to the embodiment of the present invention will be described in detail.

Figure 2:
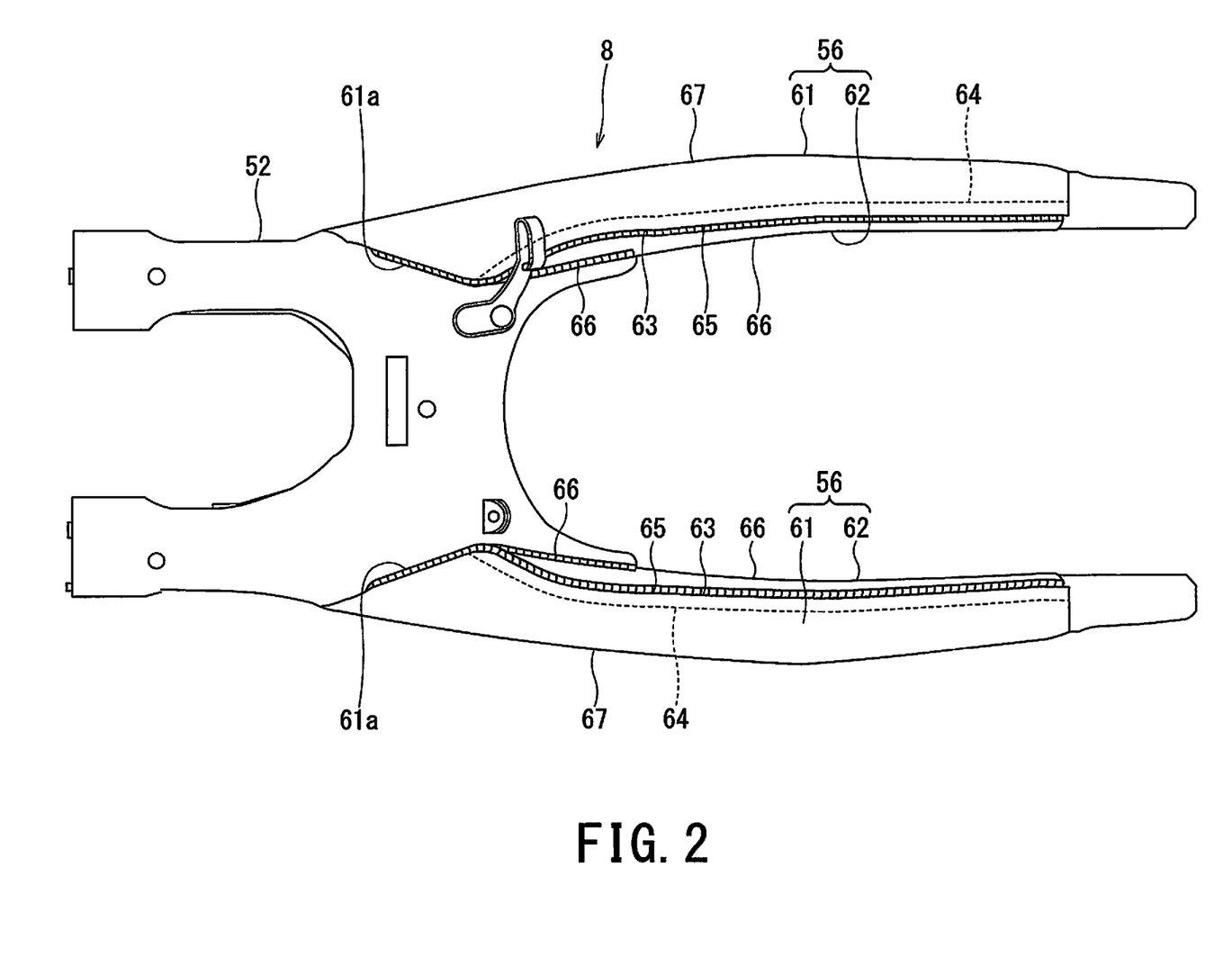
FIG. 2 is a plan view of the swing arm according to the embodiment of the present invention.

FIG. 2 is a plan view of the swing arm according to the present embodiment.

Figure 3:
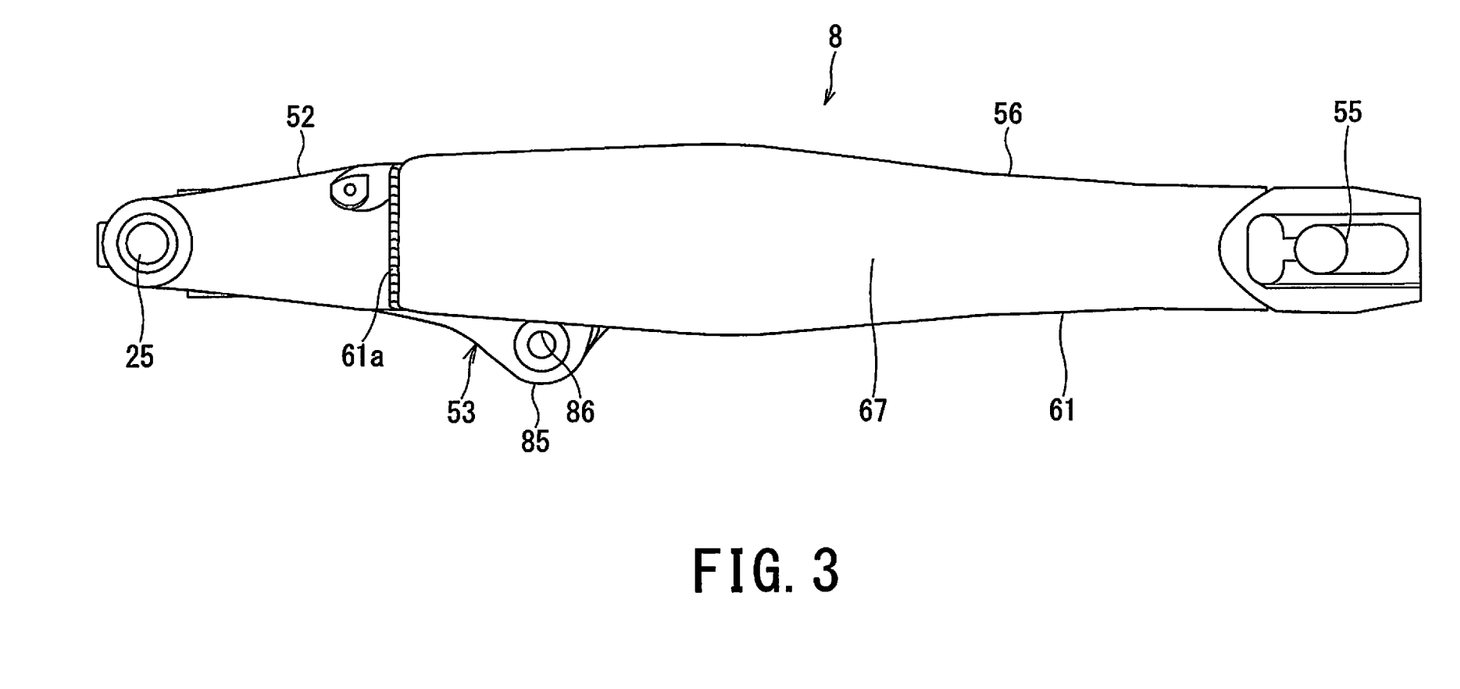
FIG. 3 is a left side view of the swing arm according to the embodiment of the present invention.

FIG. 3 is a left side view of the swing arm according to the embodiment of the present invention.

Figure 4:
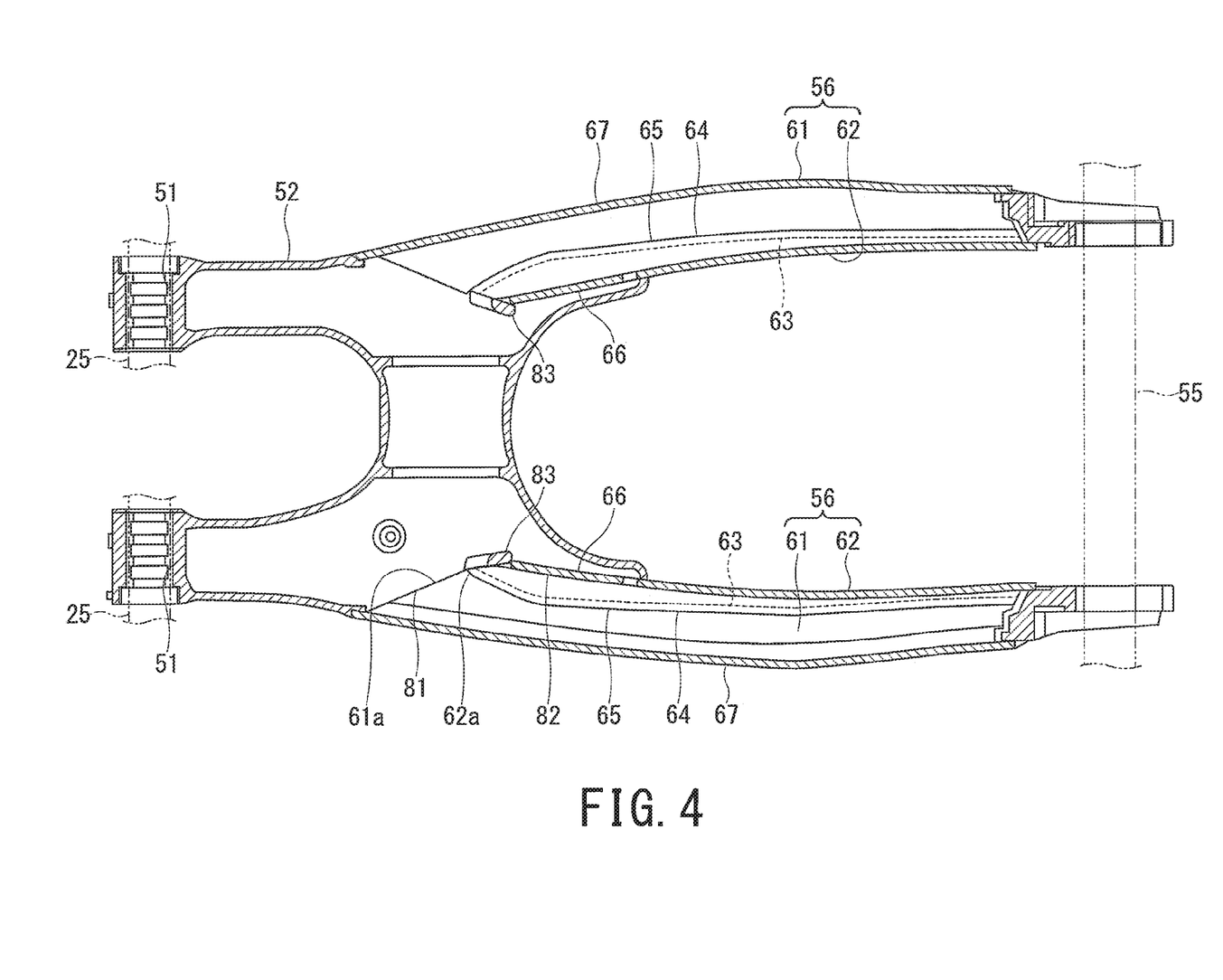
FIG. 4 is a cross-sectional plan view of the swing arm according to the embodiment of the present invention.

FIG. 4 is a cross-sectional plan view of the swing arm according to the embodiment of the present invention.

Figure 5:
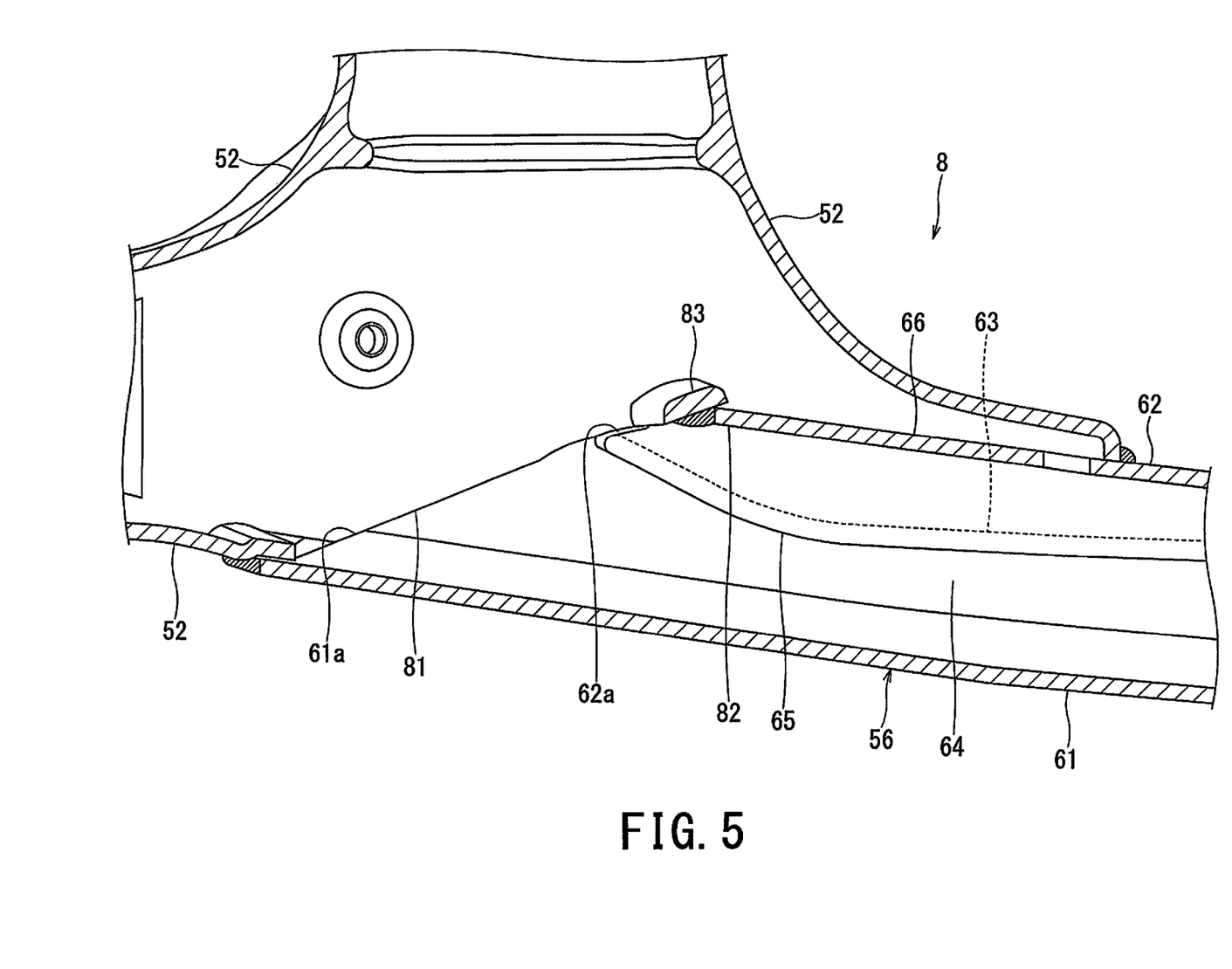
FIG. 5 is an enlarged view of a part of FIG. 4.

FIG. 5 is an enlarged view of a part of FIG. 4.

Figure 6:
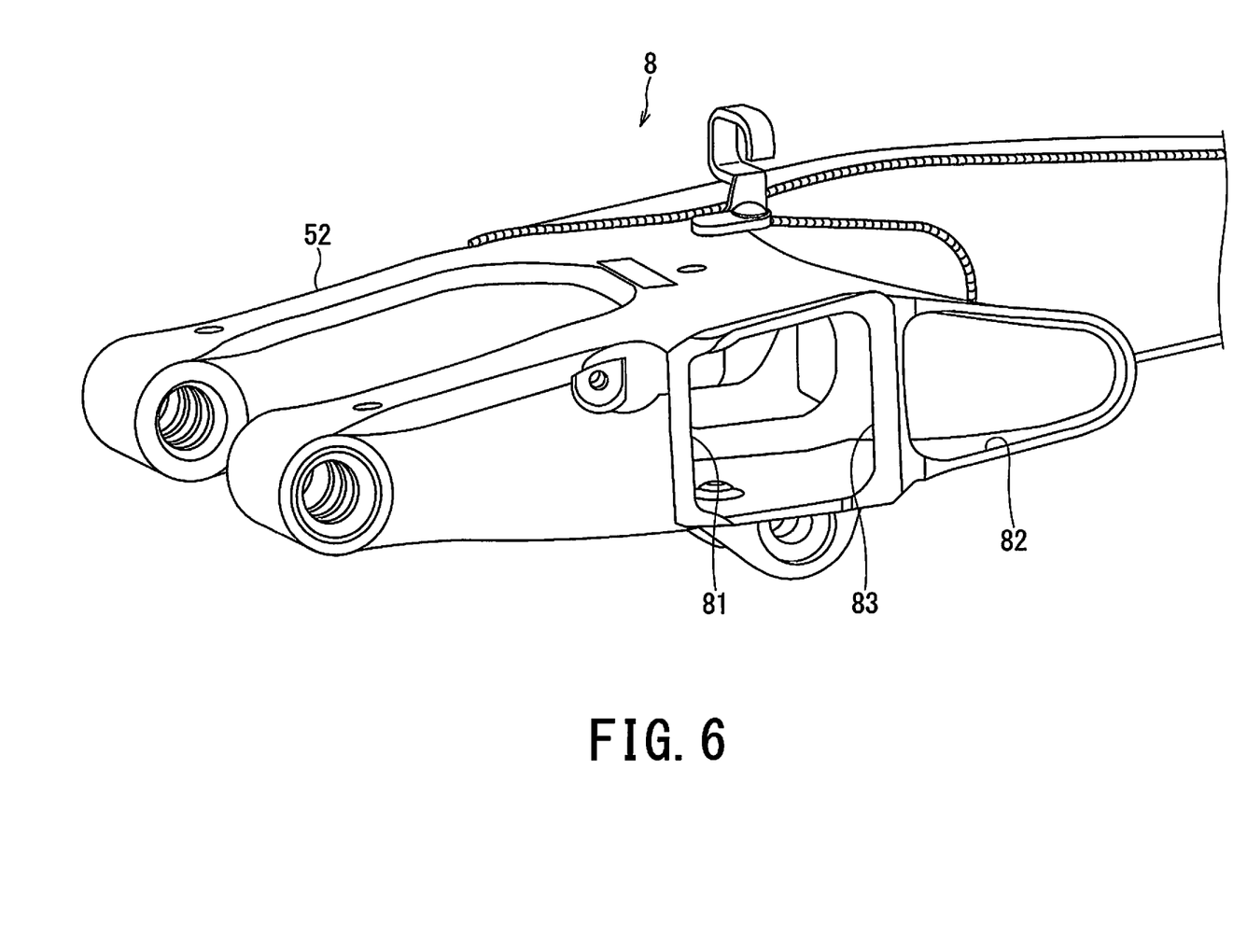
FIG. 6 is a perspective view of the swing arm according to the embodiment of the present invention, with the left arm removed.

FIG. 6 is a perspective view of the swing arm according to the embodiment of the present invention, with the left arm removed.

Figure 7:
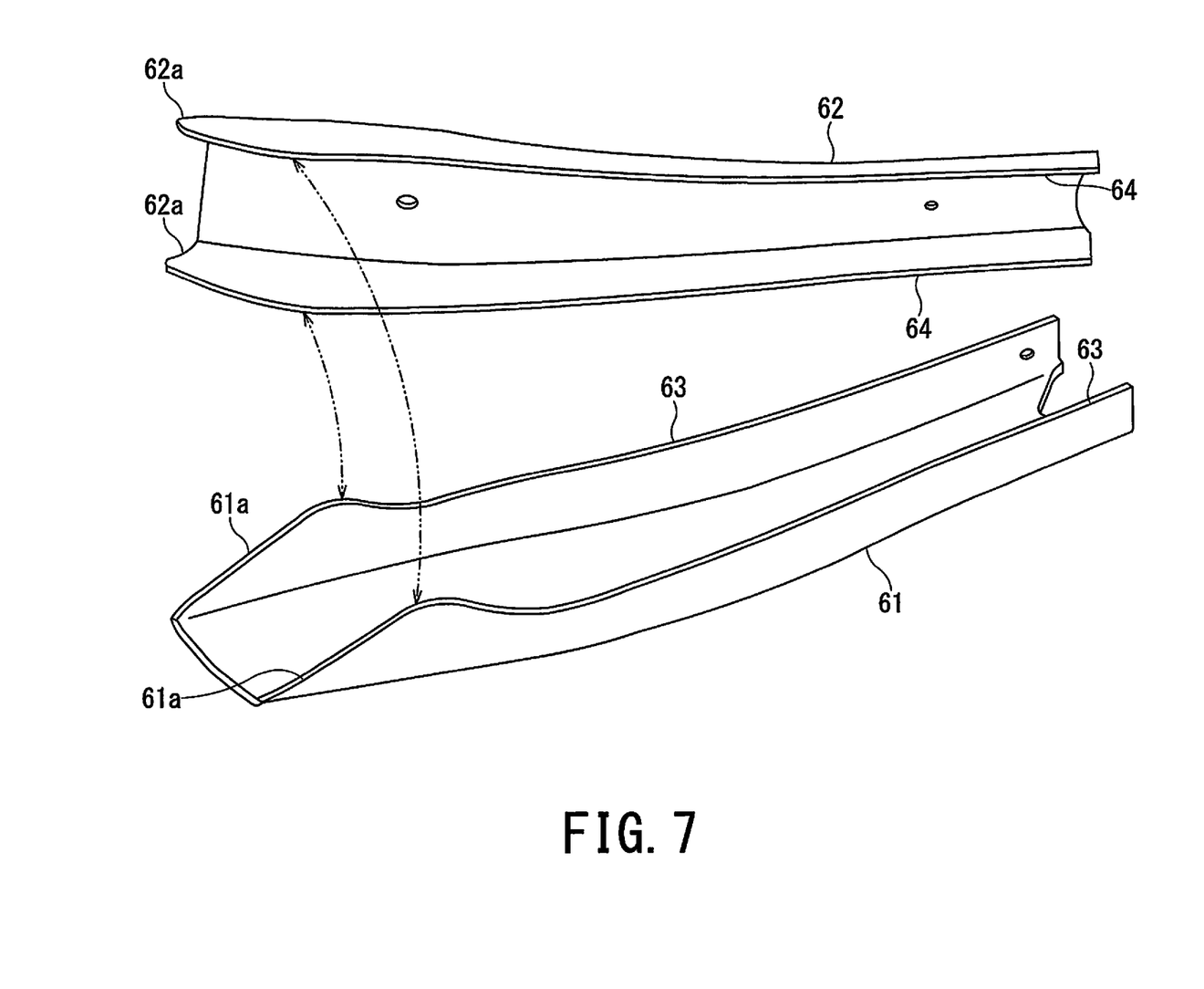
FIG. 7 is a partial exploded perspective view of the arm of the swing arm according to the embodiment of the present invention.

FIG. 7 is a partial exploded perspective view of the arms of the swing arm according to the embodiment of the present invention.

As shown in FIG. 2 to FIG. 7, the swing arm 8 according to the embodiment of the present invention includes a hollow body 52, a suspension fixing portion 53, and a pair of arms 56. The body 52 has a pivot hole 51 in which the pivot shaft 25 is disposed. The suspension fixing portion 53 is provided to the body 52, and is connected to one end portion of the rear suspension unit 35. The pair of arms 56 extend from the body 52, and support respective ends of an axle 55 of the rear wheel 7.

The pair of arms 56 pinch the rear wheel 7 from the right and left. In other words, the rear wheel 7 is disposed between the pair of arms 56. The front end portions of the respective arms 56 are fixed to the body 52. The axle 55 is bridged across the rear ends of the respective arms 56.

Each of the arms 56 includes an outer member 61 having an open cross-section and an inner member 62 having an open cross-section.

The outer members 61 and the inner members 62 of the respective two arms 56 are, e.g., casting. The outer members 61 and the inner members 62 may be workpieces formed by plastic working such as forging, extrusion, rolling, and drawing. Each of the outer members 61 and the inner members 62 has a cross-section of an open shape (i.e. so-called open cross-section) in the cross-section orthogonal to its longitudinal direction (FIG. 7), and this open cross-section is a square-bracket shape (U-shaped). In other words, each of the outer members 61 and the inner members 62 has a cross-sectional shape like a so-called channel steel.

The outer member 61 and the inner member 62 of the right arm 56 are joined with each other at the respective open end portions 63 and 64, and the same holds true for the left arm 56. In each of the arms 56, the outer member 61 and the inner member 62 are joined with, e.g., welding or friction stir welding. In each of the arms 56, the open end portion 63 of the outer member 61 and the open end portion 64 of the inner member 62 are joined with each other. Thus, the cross-section orthogonal to the longitudinal direction of arms 56 are a closed shape section (i.e., so-called closed cross-section). The cross-section orthogonal to the longitudinal direction of arms 56 are specifically a rectangular cross-section.

In each of the arms 56, the open end portion 63 of each outer member 61 and the open end portion 64 of the inner member 62 may have superimposed portions such that these open end portions 63 and 64 are entirely superimposed or partially overlapped each other. In other words, the open end portion 63 of the outer member 61 may cover the outer side of the open end portion 64 of the inner member 62 in each of the arms 56. Additionally, the open end portion 64 of the inner member 62 may cover the outer side of the open end portion 63 of the outer member 61 in each of the arms 56. Further, in each of the arms 56, the open end portion 64 of the inner member 62 may be provided with a flange that is inserted inside the open end portion 63 of the outer member 61. Similarly, in each of the arms 56, the open end portion 63 of the outer member 61 may be provided with a flange that is inserted inside the open end portion 64 of the inner member 62. In these cases, it is sufficient that the open end portion 63 of the outer member 61 and the open end portion 64 of the inner member 62 in each of the arms 56 are joined with each other at least between the open end of the outwardly disposed member (i.e., one of 61 and 62) and the outer surface of the member (i.e., the other of 61 and 62) disposed inside. The open end portion 63 of the outer member 61 and the open end portion 64 of the inner member 62 in each of the arms 56 may be joined between the open end of the member disposed inside and the inner surface of the member disposed outside or may not be joined. Further, the open end portion 63 of the outer member 61 and the open end portion 64 of the inner member 62 in each of the arms 56 may be butted to be joined with each other (so-called butt welding).

In each of the arms 56, the open end portion 63 of the outer member 61 and the open end portion 64 of the inner member 62 may be straight or bent. In other words, a joint surface 65 between the outer member 61 and the inner member 62 of each arm 56 may be straight or may be bent. The joint surface 65 of each arm 56 according to the present embodiment is curved in the front half portion of each arm 56 toward the outer surface than the inner surface of each arm 56.

Further, the joint surface 65 between the outer member 61 and the inner member 62 in each arm 56 may pass through the center of the width dimension of each arm 56 in a vehicle plan view or may not pass through the center. The joint surface 65 of each arm 56 according to the present embodiment is closer to the inner surface of each arm 56 than the center of the width dimension of each arm 56 in a vehicle plan view. In other words, the joint surface 65 of each arm 56 is closer to the inner surface of each arm 56 than the outer surface of each arm 56 in a vehicle plan view.

The inner surface of each arm 56 corresponds to the outer surface 66 of its inner member 62. The outer surface of each arm 56 corresponds to the outer surface 67 of its outer member 61. The top surface of each arm 56 includes the top surface of its inner member 62 and the top surface of its outer member 61. The bottom surface of each arm 56 includes the bottom surface of its inner member 62 and the bottom surface of its outer member 61.

The body 52 and the suspension fixing portion 53 are integrally molded products by casting. The front half of the body 52 bifurcates, i.e., branches toward the right and left directions of the motorcycle 1. A pivot hole 51 is formed at the front end portion of the body 52. The body 52 is also a hollow member. In other words, the body 52 has a cavity.

The body 52 includes a pair of right and left first opening portions 81, a pair of right and left second opening portions 82, and a pair of right and left reinforcing support-struts 83. The right first opening portion 81 is joined with a front edge portion 61a as one edge portion of the outer member 61 of the right arm 56, and the left first opening portion 81 is joined with the front edge portion 61a of the outer member 61 of the left arm 56. The right second opening portion 82 is joined with the outer surface 66 of the inner member 62 of the right arm 56, and the left second opening portion 82 is joined with the outer surface 66 of the inner member 62 of the left arm 56. The right reinforcing support-strut 83 divides the right first opening portion 81 and the right second opening portion 82, and is joined with the front edge portion 62a as one edge portion of the inner member 62 of the right arm 56. Similarly, the left reinforcing support-strut 83 divides the left first opening portion 81 and the left second opening portion 82, and is joined with the front edge portion 62a of the inner member 61 of the left arm 56.

The first opening portions 81 spatially connects the internal space of the arms 56 with the cavity in the body 52. In other words, the internal space of the right arm 56 communicates with the cavity in the body 52 via the right first opening portion 81, and the internal space of the left arm 56 communicates with the cavity in the body 52 via the left first opening portion 81. Each of the first opening portions 81 conforms to the shape of the front edge portion 61a of each outer member 61. In other words, each of the first opening portions 81 has a rectangular opening adapted to the front edge of each outer member 61 which has a U-shaped cross-section (i.e., cross-section of a square-bracket shape). Each of the first opening portion 81 includes three portions which are a portion joined with the front edge of the outer surface 66 of the corresponding (i.e., right or left) outer member 61, a portion joined with the front edge of the top surface of the corresponding outer member 61, and a portion joined with the front edge of the bottom surface of the corresponding outer member 61.

The front edge of each outer member 61 and each first opening 81 may have superimposed portions. In other words, the front edge of the outer member 61 of the right arm 56 may cover the outer side of the right first opening portion 81, and the front edge of the outer member 61 of the left arm 56 may cover the outer side of the left first opening portion 81. In addition, each first opening portion 81 may cover the outer side of the front edge of the outer member 61 of the corresponding (i.e., right or left) arm 56. Further, a flange may be provided at each first opening 81 which is inserted inside the front edge of the corresponding outer member 61. At the front edge of each outer member 61, a flange to be inserted into the corresponding first opening portion 81 may be provided. Moreover, each first opening portion 81 and the front edge of the outer member 61 of the corresponding arm 56 may be butted so as to be joined with each other.

The second opening portions 82 spatially connects the internal space of the arms 56 with the cavity in the body 52 in a manner similar to the first opening portion 81. In other words, the internal space of the right arm 56 communicates with the cavity in the body 52 via the right first opening portion 81 and the right second opening portion 82, and the internal space of the left arm 56 communicates with the cavity in the body 52 via the left first opening portion 81 and the left second opening portion 82. Each of the second opening portions 82 has a shape which follows the outer surface 66 of each inner member 62 (i.e., the inner surface of each arm 56). Each of the second opening portions 82 has a tapered opening narrowing in the vertical direction of each arm 56 as it is separated away from the corresponding first opening portion 81.

Each of the reinforcing support-struts 83 is installed between the top surface and the bottom surface of the body 52. Each of the reinforcing support-struts 83 is a part of body 52 which is an integrally molded product. In other words, the reinforcing support-struts 83 are integrally formed with the body 52. Each of the reinforcing support-struts 83 is thin in the inner and outer directions of the hollow body 52 and has a plate shape which is wide in the direction orthogonal to the inner and outer directions. In the completed state of the swing arm 8, the right reinforcing support-strut 83 is disposed on an extension line of the inner surface of the right arm 56 (i.e., on an extension line of the outer surface 66 of the inner member 62 of the right arm 56) and the left reinforcing support-strut 83 is disposed on an extension line of the inner surface of the left arm 56.

The suspension fixing portion 53 is integrally formed on the bottom surface of the body 52. As shown in FIG. 3, the suspension fixing portion 53 includes a pair of right and left flanges 85. Each of the pair of flanges 85 has a hole 86 such that a non-illustrated bolt is inserted through the pair of holes 86 for swingably supporting the rear suspension unit 35.

The first opening portions 81 and the second opening portions 82 are inclined with respect to the front-rear direction of the swing arm 8. The closer the pair of the first openings 81 are to the rear side of the swing arm 8, the more the pair of the first openings 81 approach each other. In other words, the separation distance between the pair of the first opening portions 81 is narrower toward the rear side of the swing arm 8. The pair of the second opening portions 82 are separated from each other as they approach the rear side of the swing arm 8. In other words, the separation distance between the pair of the second opening portions 82 is wider toward the rear side of the swing arm 8.

That is, the right first opening portion 81 and the right second opening portion 82 are adjacent to each other with the right reinforcing support-strut 83 interposed as a boundary therebetween and are bent with the right reinforcing support-strut 83 as a boundary, and the same holds true on the left side. The separation distance between the pair of the first opening portions 81 and the separation distance between the pair of the second opening portions 82 are the narrowest at the position partitioned with the respective reinforcing support-struts 83.

The suspension fixing portion 53 is arranged in the area between a right region including the right opening portions (i.e., first and second opening portions 81 and 82 on the right side) and a left region including the left opening portions (i.e., first and second opening portions 81 and 82 on the left side) of the body 52 in a plan view of the motorcycle 1. The arrangement area of the suspension fixing portion 53 may be on the bottom surface side or on the top surface side of the body 52. In addition, the arrangement area reaches from the front edges of the respective first opening portions 81 to the rear edges of the respective second opening portions 82 in a plan view of the swing arm 8. The entirety or a part of the suspension fixing part 53 may be arranged in the area between the right region and the left region of the body 52 in the plan view of the motorcycle 1.

The swing arm 8 according to the embodiment of the present invention includes the first opening portions 81 joined with the front edge portions 61a of the respective outer members 61, the second opening portions 82 joined with the outer surface 66 of the respective inner members 62, and the reinforcing support-struts 83, each of which partitions the first and second opening portions 81 and 82 on the right or left side and is joined with the front edge portion 62a (one edge part) of the inner member 62. Consequently, the swing arm 8 is lighter than the conventional swing arm that has a reinforcing wall crossing the internal space of the body 52. In addition, the swing arm 8 reinforces the connecting portion between the body 52 and the arms 56 with the reinforcing support-struts 83 to secure the rigidity. Further, the rigidity of the swing arm 8 is enhanced by the reinforcing support-struts 83. Hence, the swing arm 8 effectively receives the impact that is inputted to push up from the rear wheel 7 via the arms 56.

Further, the swing arm 8 according to the embodiment of the present invention is provided with the suspension fixing portion 53 that is arranged in the area between the region including the adjacent first and second opening portions 81, 82 on the right side and the opposite region including the adjacent first and second opening portions 81, 82 on the left side. Consequently, the swing arm 8 reinforces the portion, to which load is applied from the rear suspension unit 35, with the reinforcing support-struts 83 to secure the rigidity.

Therefore, the swing arm 8 according to the embodiment of the present invention is lighter than the conventional swing arm that has the reinforcing wall crossing the internal space of the body 52, and can secure rigidity.

What is claimed is:

1. A swing arm comprising:
a hollow body provided with a pivot hole in which a pivot shaft is disposed;
a suspension fixing portion provided in the body and connected to one end portion of a suspension unit; and
a pair of arms extending from the body and supporting respective ends of an axle of a wheel,
wherein the body and the suspension fixing portion are integrally molded by casting;
wherein each of the pair of arms comprises an outer member having an open cross-section and an inner member having an open cross-section;
wherein the outer member and the inner member of each of the arms are welded at respective open end portions;
wherein the body includes first opening portions welded with a corresponding one edge portion of the outer member of the arms, second opening portions welded with a corresponding outer surface of the inner member of the arms, and reinforcing support-struts that partition the first opening portions and the second opening portions, are welded with a corresponding front edge portion of the inner member of the arms, reinforce welds between the body and the arms, are bridged between top surfaces and bottom surfaces of the body, and are separated from each other and independent.

2. The swing arm according to claim 1,
wherein the first opening portions comprise a pair of right and left first opening portions;
wherein the second opening portions comprise a pair of right and left second opening portions; and
wherein the suspension fixing portion is arranged in the area between right openings that include the right first opening portion and the right second opening portion and left openings that include the left first opening portion and the left second opening portion, in the body.

* * * * *